US005396277A

United States Patent [19]

Gast et al.

[11] Patent Number: 5,396,277

[45] Date of Patent: Mar. 7, 1995

[54] SYNCHRONIZED CARRIAGE AND WIPER MOTION METHOD AND APPARATUS FOR INK-JET PRINTERS

[75] Inventors: Paul D. Gast; Alan Shibata, both of Vancouver; Eva-Maria Moon, Washougal, all of Wash.

[73] Assignee: Hewlett-Packard Company, Palo Alto, Calif.

[21] Appl. No.: 951,276

[22] Filed: Sep. 25, 1992

[51] Int. Cl.[6] ........................ G01D 15/18; B41J 2/165

[52] U.S. Cl. ........................................................ 347/33

[58] Field of Search ........................ 346/140 R; 347/33

[56] References Cited

U.S. PATENT DOCUMENTS

| | | | |
|---|---|---|---|
| 5,096,276 | 3/1992 | Midorikawa | 346/140 R |
| 5,103,244 | 4/1992 | Gast et al. . | |
| 5,126,765 | 6/1992 | Nakamura | 346/140 R |

FOREIGN PATENT DOCUMENTS

| | | | |
|---|---|---|---|
| EP 0398348 | 11/1990 | European Pat. Off. . | |
| EP 0469619 | 2/1992 | European Pat. Off. . | |
| 58-94472 | 6/1983 | Japan | 347/33 |

OTHER PUBLICATIONS

Patent Abstracts of Japan; vol. 12, No. 126 M-687, Apr. 19, 1988 & JP-A-62 251 145 (Terasawa Hiroharu) Oct. 31, 1987.

*Primary Examiner*—Benjamin R. Fuller
*Assistant Examiner*—Craig Hallacher

[57] ABSTRACT

A synchronized wiper and pen motion solution for ink-jet printers is described. The invented method and apparatus synchronize the motion of the pen and wiper throughout the wipe stroke, and provide for controlled, simultaneous movement therebetween that avoids pole vaulting, excess interference and ink flicking. Such is accomplished by moving the carriage to a defined position shy of a wiping position above the service station including a sled mounting the wiper; raising the sled to produce a proper interference fit between the wiper and the pen while simultaneously moving the carriage at low speed; continuing the wipe stroke by high-speed carriage movement with the sled stationary; and, at the end of the stroke, lowering the sled to clear the wiper from contact with the pen before reversing carriage motion. The solution lends itself to single- or plural-pen ink-jet printers.

10 Claims, 6 Drawing Sheets

SYNCHRONIZED CARRIAGE AND WIPER MOTION METHOD AND APPARATUS FOR INK-JET PRINTERS

TECHNICAL FIELD

The present invention relates generally to wiping pens of an ink-jet printer. More particularly, the invention concerns method and apparatus that provide synchronized motion between a carriage's printhead-mounted pen and a service station's sled-mounted wiper that minimizes wiper and pen wear or damage and wiper stroke width, and avoids flicking of wet ink into printer recesses.

BACKGROUND ART

Previously, the wiping of pens in ink-jet printheads involved moving the printhead carriage to a position above the service station containing the wipers, raising the service station to a predetermined height of interference between the wiper tips and the pens and then moving the carriage across the stationery wiper tips. This often caused the wiper tips at the end of the wipe stroke uncontrollably to flick wet ink into the printer. It also frequently caused the resilient wiper to "pole-vault" at the beginning of the wipe stroke due to a reverse bias angle of the wiper as it contacted the pen and at the end of the wipe stroke due to reversal of the direction of carriage motion while the wiper was still in contact with the pen. Pole vaulting is undesirable also because it impacts the pen upwardly, potentially damaging the pen or the wiper or both. One previously proposed solution to the pole vault tendency has been to continue the wipe stroke all the way across the pen surface until it was clear of the pen before reversing the printhead carriage's direction. Unfortunately, this increases the lateral carriage travel and thus the width of the ink-jet printer's footprint, which is a critical parameter in many printer installations. It also virtually guarantees that wet ink will be flicked into recesses within the printer as the deflected, resilient wiper springs free of the pen.

Vertically reciprocable sleds mounting wipers for servicing ink-jet pens recently have been developed for use in ink-jet printers. One such sled subsystem is described in co-pending U.S. application Ser. No. 07/954,846, entitled "Printer Service Station", filed Sep. 30, 1992, of Gast et al., and subject to common ownership herewith. The disclosure of that patent application is incorporated herein by this reference.

DISCLOSURE OF THE INVENTION

The invented method and apparatus synchronizes the motion of the pen and wiper throughout the wiper stroke, and provides for the simultaneous controlled movement therebetween that shortens the wipe stroke and avoids pole vaulting and ink flicking. Such is accomplished by moving the carriage to a defined position shy of a wiping position above the sled-mounted wiper of the service station, raising the sled to produce a proper interference fit between the wiper and the pen while simultaneously moving the carriage at low speed, continuing the wipe stroke by high-speed carriage movement with the sled stationary and at the end of the stroke lowering the sled to clear the wiper from interference with the pen before reversing carriage motion. The solution lends itself to single- or plural-pen ink-jet printers, and is particularly important in plural-pen printers, where ink flicking can cause inter-pen (black or color ink) contamination.

These and additional objects and advantages of the present invention will be more readily understood after a consideration of the drawings and the detailed description of the preferred embodiment.

DETAILED DESCRIPTION OF THE PREFERRED EMBODIMENT AND BEST MODE OF CARRYING OUT THE INVENTION

FIGS. 1A through 1E show in a simplified, schematic front elevation a prior art wiper system that exhibits many of the problems solved by the invented method and apparatus. FIGS. 1A through 1E show conventional pen-wiping apparatus including a fixed sled 10 mounting a resilient wiper 12 and a movable printhead carriage 14 fixedly mounting a pen 16. It will be appreciated that only one pen and its corresponding wiper are shown in FIGS. 1A through 1E, although typically more than one of each are mounted side by side, respectively, on a common carriage and a common sled or other wiper-mounting structure. It also will be appreciated that the prior art wiper system is shown only fragmentarily and that the drive motor for carriage 14 is not shown, for the sake of clarity, but that movement of carriage 14 relative to sled 10 is indicated by arrows.

Figure 1A:
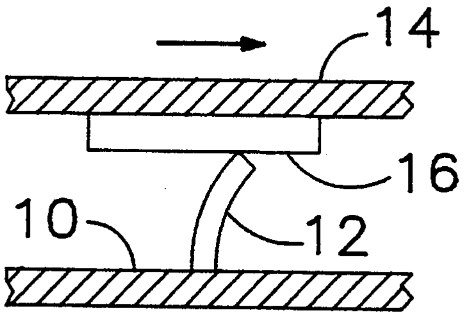
Fig. 1A (PRIOR ART)
FIGS. 1A through 1E schematically illustrate some of the problems with prior art wiper systems, by showing in front elevation a sled-mounted wiper in various phases of its carriage-mounted pen wipe stroke.
Figure 1B:
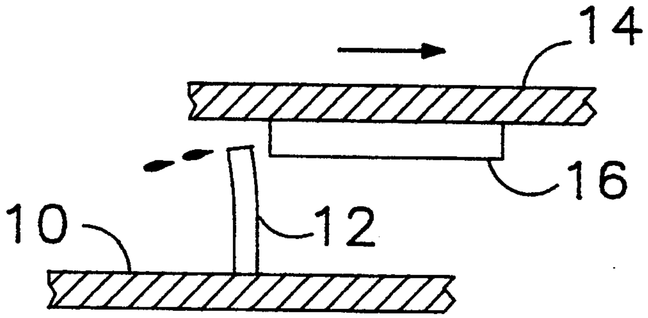
Fig. 1B (PRIOR ART)

FIGS. 1A and 1B together illustrate the end-of-wipe stroke ink flicking problem common to prior art wiper systems. (The beginning-of-wipe stroke ink flicking problem is not illustrated herein, but will be understood to result from vertical elevation of wiper 12, with a slight angular bias against the direction of carriage movement, into contact with pen 16 and to produce similar undesirable effects.) FIG. 1A shows carriage 14 moving to the right, mid-wipe, with wiper 12 flexed into interference-fit contact, or simply interference contact, with pen 16. FIG. 1B shows a later phase of operation in which carriage 14 has been moved farther to the right such that pen 16 clears wiper 12, which reverses its flexure upon its release and typically flicks wet ink into the ink-jet printer's service station or, worse, onto its carriage mechanism. Such flicking causes undesirable accumulation of ink within the vicinity of the vicinity of sled 10. At best, the service station of which sled 10 is a part becomes messy. At worst, the service station becomes contaminated with dried ink, which causes friction or interference that may result in printer malfunction.

Figure 1C:
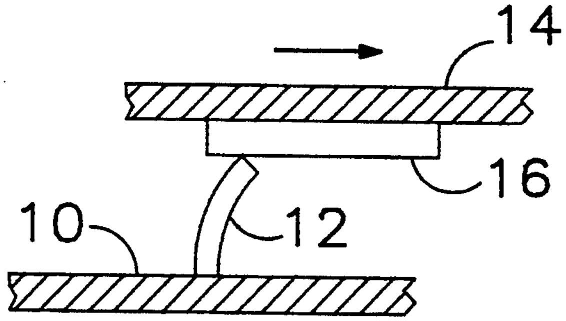
Fig. 1C (PRIOR ART)
Figure 1D:
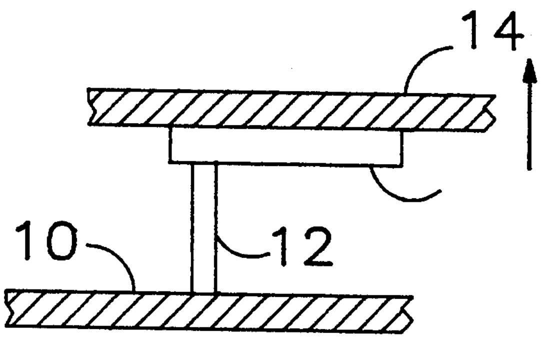
Fig. 1D (PRIOR ART)
Figure 1E:
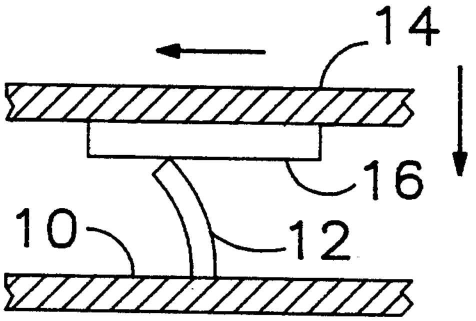
Fig. 1E (PRIOR ART)

FIGS. 1C through 1E together illustrate what is referred to herein as the pole vault problem common to prior art wiper systems. FIG. 1C shows carriage 14 moving to the right near its end-of-wipe position, with wiper 12 flexed into interference fit with pen 16. FIG. 1D shows carriage 14 stopped at its end-of-wipe position. As may be seen from FIG. 1D, wiper 12 is compressed between fixed sled 10 and pen 16 at the point when its flexure is forced to reverse itself. Importantly, an undesirable upward force is imparted by wiper 12 on pen 16 and consequently on carriage 14. If carriage 14 yields to this upward force, as by resilient or gimbal mounting relative to sled 10, then pen 16 is elevated slightly out of its nominal wiping plane. If instead carriage 14 fails to yield, then pen 16 and or wiper 12 may be damaged or excessively worn to the extent of the interference fit and friction therebetween. FIG. 1E shows carriage 14 moving to the left mid-return wipe, with wiper 12 now exhibiting the reverse of its original flexure, which permits carriage 14 and pen 16 to return to their nominal wiping plane.

Conventional wisdom has been that wiper systems would exhibit either the flicker problem illustrated in FIGS. 1A and 1B or the pole vault problem illustrated in FIGS. 1C through 1E. It is noted that the former also typically causes undue wear on the tip of wiper 12 as it comes into contact with the edge of pen 16 (with reversal of movement in carriage 14 after the flicking shown in FIG. 1B), and that the latter also typically causes some ink flicking from what might be referred to as a whipsaw action of wiper 12 (with reversal of flexure of wiper 12 occurring as suggested by FIG. 1D). It is also apparent from FIGS. 1A and 1B that the wipe stroke necessarily must be made longer, in order for wiper 12 to clear the far edge of pen 16 before the direction of carriage 14 is reversed. A longer wipe stroke results in a wider footprint for the ink-jet-printer, which typically is placed on a desk top where space is at a premium.

Figure 2A:
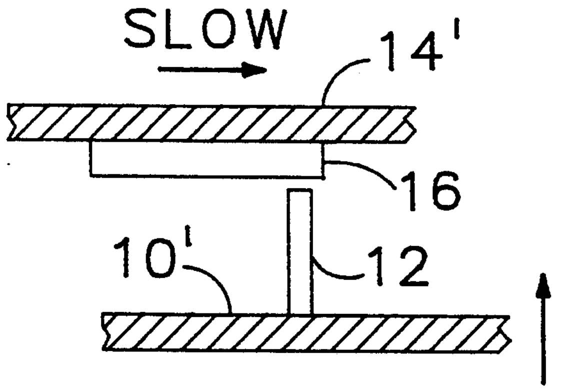
FIGS. 2A through 2E schematically illustrate the invented method and apparatus, by showing in front elevation a wiper in various phases of its wipe stroke.

Turning now to FIGS. 2A through 2E, the preferred method of the invention may be understood. By the invented ink-jet printer pen wiping method wherein a pen such as pen 16 is mounted on a horizontally movable carriage 14' and wherein a wiper such as wiper 12 is mounted on a vertically movable sled 10' forming part of the printer's service station, sled 10' is positioned at a first predefined elevation relative to carriage 14' such that wiper 12 is below the level of pen 16, as shown in FIG. 2A. Next, carriage 14' is first moved in a first direction, e.g. to the right in FIG. 2A to the position shown in FIG. 2B, to a position above the service station. Concurrently with this first moving of carriage 14', sled 10' is moved to a second predefined elevation relative to the carriage, ask shown in FIG. 2B, thereby producing controlled-direction flexure, e.g. to the right in FIG. 2B, of wiper 12 as the tip thereof comes into interference contact with pen 16.

Figure 2B:
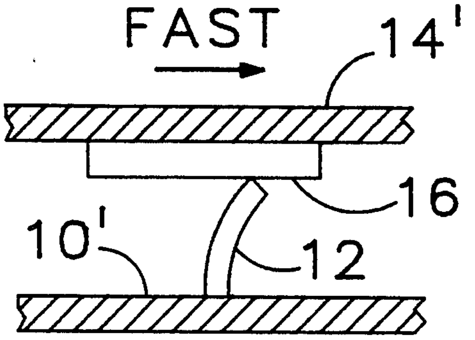
Figure 2C:
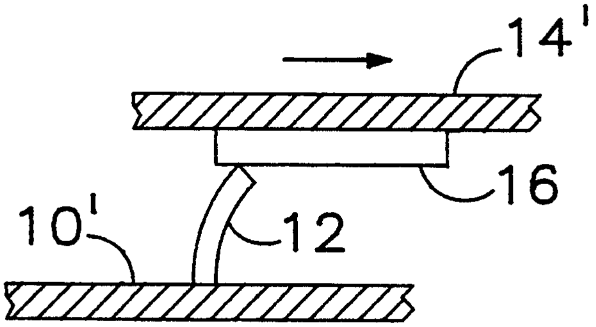

The invented method further includes wiping pen 16 with wiper 12 by second moving carriage 14', in the same direction in such position above the service station, relative to sled 10' with wiper 12 remaining in interference contact with pen 16, as seen by reference to FIGS. 2B and 2C. FIG. 2C will be understood to show wiper 12 immediately before it has reached its end-of-wipe position, with carriage 14' still moving (to the right in FIG. 2C). Thus, FIGS. 2B and 2C will be understood to illustrate the pen-wiping movement of carriage 14' with sled 10' fixed at its wiping elevation.

As indicated in FIGS. 2A and 2B, carriage 14' is movable by, for example, the printer's controller controlling the carriage's motor, at plural speeds. Preferably, the first moving by which carriage 14' is positioned above the service station is performed at a first, SLOWer speed, e.g. preferably approximately 1 inch per second (1 ips), and the second moving by which carriage 14' is moved in the first direction is performed at a second, FASTer speed, and preferably at a substantially faster speed, e.g. preferably approximately 12 ips. Because the first and second moving of carriage 14' are performed at different carriage speeds, pen wiping is very fast but also very controlled. Fast wiping is needed because extended service cycle times take the printer off line too long to meet high throughput requirements and too long to meet time-critical color hue quality requirements. Relatively slow wiping of pen 16 is needed in order to ensure controlled flexure of wiper 12 as it first engages pen 16 and to avoid undesirable pole vaulting.

Figure 2D:
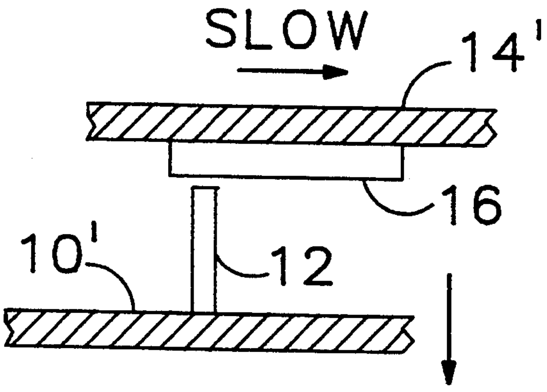
Figure 2E:
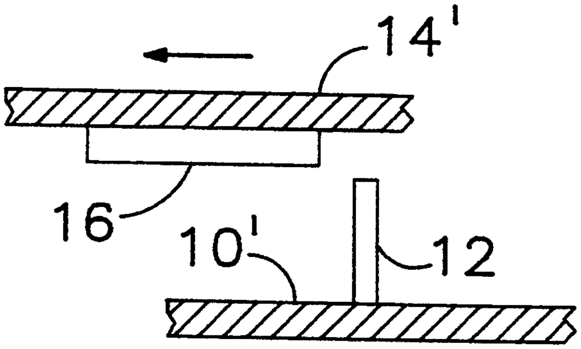

Turning now to FIGS. 2D and 2E, the next step of the preferred method of the invention will be explained. When carriage 14' reaches the end-of-wipe position relative to sled 10' shown in FIG. 2D, and prior to a time at which wiper 12 would reach a far end of pen 16 and during a time when wiper 12 still in interference contact with pen 16, the movement of carriage 14' is ceased such that carriage 14' comes to a stop. Proximately in time to such cessation of motion of carriage 14', and preferably substantially at the same time, sled 10' is lowered as shown in FIG. 2D to a second predefined elevation relative to carriage 14' in which wiper 12 is clear of pen 16.

The invented method by which carriage 14' is moved horizontally and sled 10' is moved vertically, with the movements taking place concurrently, wiper 12 is brought into interference contact with pen 16 in a highly controlled way. After wiping pen 16, carriage 14' is stopped and preferably closely proximate in time thereto sled 10' is lowered. These latter synchronized movements of carriage 14' and sled 10' produce a controlled release of the flexure of wiper 12 into its nominally unflexed, upright condition shown in FIG. 2D that avoids the ink flicking problem. Such synchronized movement of carriage 14' and sled 10' is provided by the printer's controller, which straightforwardly is programmed to drive both a carriage motor and a sled motor (not shown herein, but which preferably cooperates with sled 10' in accordance with the teachings of the above-referenced printer service station application). As may be appreciated by a brief contrasting of FIGS. 1A through 1D and FIGS. 2A through 2D, there is no possibility of the pole-vaulting or ink-flicking problems common to prior art ink-jet pen-wiping apparatus.

Turning now to FIG. 2E, the invented method preferably further includes third moving the carriage in the reverse of such first direction, e.g. to the left in FIG. 2E, wherein the third moving is performed after the sled-lowering step described above by reference to FIG. 2D. Preferably, in the case where there is no bi-directional wiping of pen 16 by wiper 12, sled 10' remains at its lowered elevation while the printer is returned from its servicing mode to its printing mode. More preferably, in the case where pen wiping is bidirectional, carriage 14' first would be moved slowly (to the left in FIG. 2E) and simultaneously when carriage 14' was in a begin-of-wipe position above sled 10', sled 10' would be raised again to its wiping elevation for a reverse-direction wipe of pen 16 in the same manner as described above but in the reverse direction, i.e. with synchronized horizontal motion of carriage 14' and vertical motion of sled 10'. Those of skill in the arts will appreciate that, while not expressly illustrated herein, such reverse-direction wiping also would have the advantages of the invention by which there are no pole-vaulting or ink-flicking problems.

Figure 3A:
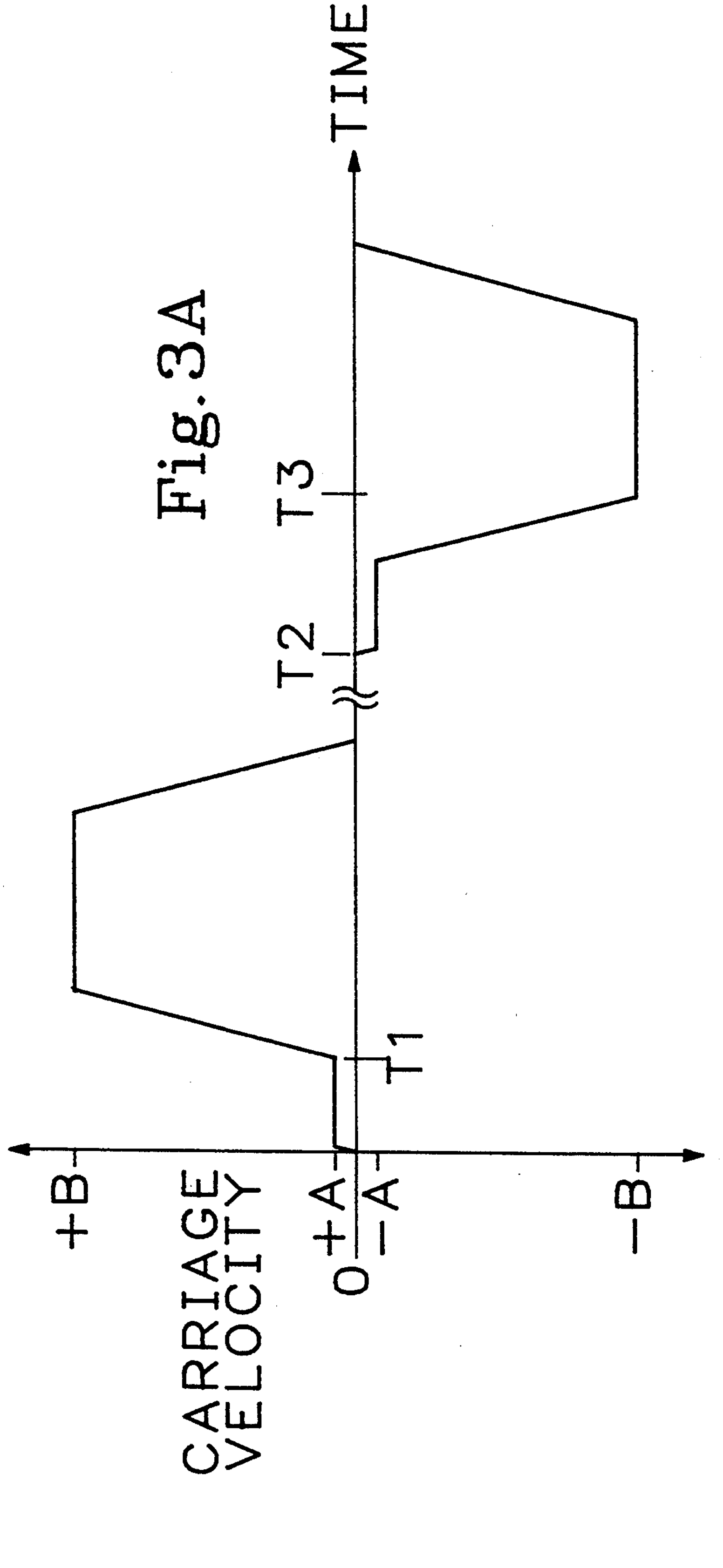
FIGS. 3A and 3B are graphs showing, respectively, sled elevation versus time and carriage velocity versus time in accordance with the preferred method and apparatus.
Figure 3B:
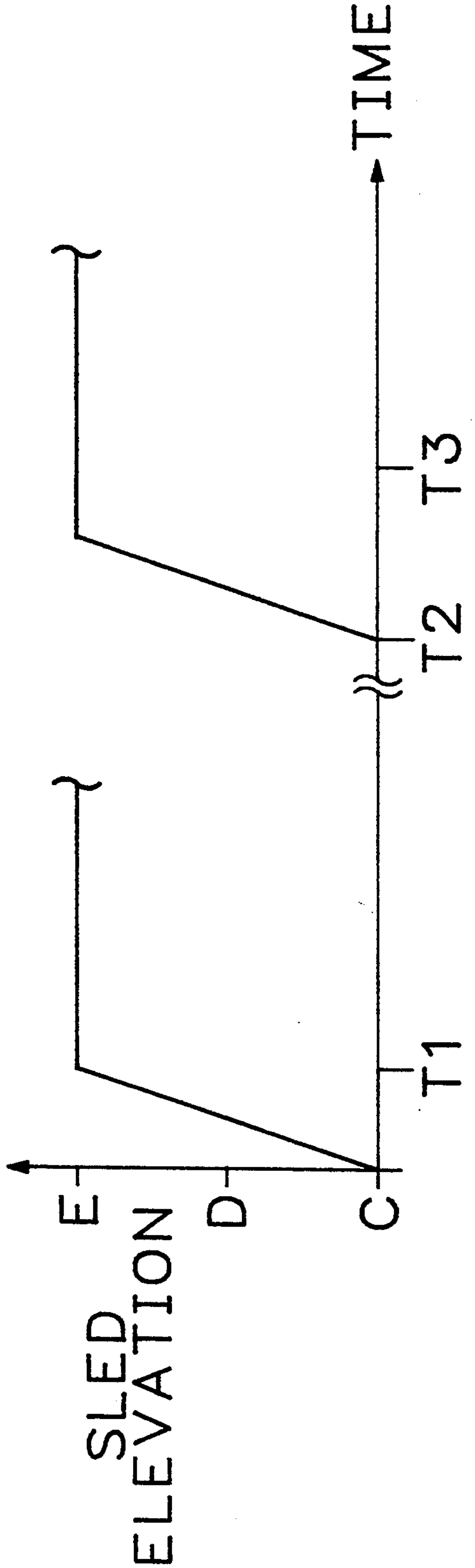

FIGS. 3A and 3B illustrate such bi-direction pen wiping, in accordance with the invented method and apparatus, by way of timing graphs of carriage velocity and sled elevation, respectively. Briefly, FIG. 3A shows the carriage moving at a relatively SLOW speed +A until time T1, where it ramps up preferably at approximately 1 g acceleration to its FAST speed +B at which wiping takes place, and then decelerating to a stop prior to the timeline break in the graph. FIG. 3B shows the sled being elevated from its lowered elevation C during the time the carriage is at SLOW speed past its nominal begin-of-contact elevation D and beyond to a desired interference contact elevation E, where it remains at least during the pen wiping and preferably somewhat beyond as indicated by the timeline break.

FIG. 3A shows the carriage beginning at T2 to accelerate to its SLOW speed −A in a reverse direction, then accelerating to reach FAST speed −B at time T3. After pen wiping at FAST speed, the carriage once again stops. Concurrently with the illustrated carriage movement, the sled, having been moved to its lowered elevation C begins at T2 to be elevated to its wiping position, preferably reaching its nominal pen-contacting elevation D while the carriage is moving yet at SLOW speed. The sled reaches the elevation E of interference contact with the pen prior to T3, such that the carriage is still moving at SLOW speed. Thereafter, and while the carriage is at FAST speed, pen wiping takes place with the sled once again at its fixed elevational position of interference pen contact by the wiper. Those skilled in the art will appreciate that the accelerations shown in FIGS. 3A and 3B are not rigorously portrayed, and may be different in slope or even variable. In accordance with the preferred method and apparatus of the invention, sled 10' is raised and lowered, or moved vertically, (the latter not being shown in the graphs of FIG. 3A and 3B) more slowly than carriage 14' is moved horizontally, although of course it is the simultaneity or concurrence of the movements, not their relative speeds, that are believed to be important to carrying out the invention.

The improvement represented by the invented apparatus may now be understood. The application of the improvement is in a pen-wiping station for an ink-jet printer, wherein the station is positioned generally along a printhead carriage's reciprocal motion axis, e.g. a generally horizontal printing axis, for selective wiping of one or more of the printhead's pens mounted on the carriage. The improvement includes sled 10' forming a part of the pen-wiping station, with sled 10' being mounted relative to the printer's chassis for vertical movement relative thereto into a pen-wiping elevation relative to the printhead when carriage 14' is moved into a service position, as illustrated in FIG. 2A. The improvement further includes a stepper motor (not shown, for the sake of simplicity) operatively connected with sled 10' for moving the same into operative pen-wiping engagement with carriage 14' responsive to a first control signal. The improvement further includes a controller, e.g. the printer's controller (also not shown) coupled with carriage 14' and the motor.

Persons of skill in the arts will appreciate that the controller straightforwardly is programmed to provide for the synchronous, generally horizontal movement of carriage 14', as shown in FIGS. 2A through 2C, and generally vertical movement of sled 10' by way of the first control signal to which the sled's motor is responsive. Previously, of course, such printer controllers as are described herein have provided for the controlled movement of a carriage such as carriage 14, and it will be appreciated that the invented improvement involves the provision of a motor to a sled such as sled 10' that is vertically reciprocable thereby and the provision of a synchronous control algorithm executed by such a printer controller synchronously to control both the carriage's and the sled's motors to achieve significantly more control over the wiping of a pen mounted on the carriage or printhead.

Accordingly, it is preferred that the controller also provides for horizontal movement of carriage 14' by way of a second control signal to a motor (not shown, for the sake of clarity) operatively coupled with carriage 14'. By such invented horizontal control of an ink-jet printer's carriage that mounts one or more pens as well as the vertical control of the ink-jet printer's sled that mounts one or more wipers, the invented improvement provides synchronous movements including simultaneous horizontal movement of carriage 14' in proximity to sled 10' and upward vertical movement of sled 10' at the beginning of a pen wiping as sled-mounted wiper 12 first engages pen 16. As pointed out above, the improvement avoids the prior art problems of relatively uncontrolled wiper movement and flexure that otherwise produce undesirable pole-vaulting and potential ink flicking.

As suggested in FIGS. 2D and 2E and as described above by reference thereto, preferably the improvement further involves the controller's causing horizontal movement of carriage 14° to stop before wiper 12 reaches an edge, e.g. a far edge relative to the direction of travel of carriage 14', of pen 16. This stopping of carriage 14', preferably in both directions of its preferably bi-directional pen-wiping motion, provides at least two important advantages. It eliminates ink flicking into recesses of the printhead, carriage, service station or elsewhere, thereby rendering the printer cleaner and less prone to malfunction. It also shortens the wipe stroke in either pen-wiping direction, thereby rendering the printer footprint narrower and less desk top space-consuming.

Preferably, the improvement further provides for the downward, generally vertical movement of sled 10' to disengage wiper 12 from pen 16 closely proximate in time with such stop of generally horizontal movement of carriage 14', as illustrated in FIGS. 2D and as described above in relation to FIGS. 3A and 3B. As noted in reference thereto, such lowering of sled 10' (which also is caused by the controller's command of the control signal to the motor operatively connected with sled 10') ensures that wiper 12 is controlledly unflexed so as to produce no whipsaw action that otherwise might flick wet ink into the printer's recesses and so as to produce no pole vault action that otherwise might undesirably raise carriage 14' and damage either or both of wiper 12 and pen 16.

The improvement preferably further involves the controller's provision for the reverse horizontal movement of carriage 14' after wiper 12 is disengaged from pen 16, as illustrated in FIG. 2E. Carriage 14' may, depending upon the desired programming of the controller, return (preferably at FAST speed) to the beginning of another print line, page or job, thereby restoring the printer to its print mode. Alternatively, carriage 14' may move in the reverse direction SLOWly, thereby to permit pen-wiping in the reverse direction of that described above and illustrated in FIGS. 2B and 2C, but to the same advantages provided by synchronous movement of carriage 14' and sled 10' by the controller.

Importantly, in accordance with the invented improvement, preferably the controller provides for same-direction, plural-speed horizontal movement of carriage 14', which plural-speed movement is illustrated in FIGS. 2A and 2B as being SLOW and FAST and in FIG. 3A as being +A and +B. By the invented improvement, there is preferably lower speed movement, e.g. 1 ips, of carriage 14' during first engagement of wiper 12 with pen 16 and there is preferably higher speed movement, and more preferably substantially higher speed movement, e.g. 12 ips, thereafter. Those of skill in the art will appreciate that generally it is preferred to move carriage 14' at high speed unless more controlled movement is desired, as during the critical first engagement of wiper 12 with pen 16. Accordingly, it is preferred that movement of carriage 14' is at high speed during the wipe strokes and during movement from one side of the printer to another, e.g. to and from the service station from the print mode of the ink-jet printer's operation.

Industrial Applicability

It may be seen then that the invented wiper system solves the prior art pole vault and ink-flicking problems, yet at extremely low cost and while maintaining the size of the ink-jet printer's footprint. The solution requires only programming the carriage drive motor for slow and fast modes of operation during pen wiping and programming the service station drive motor to move up and down synchronously therewith. Pen and wiper life is extended, and ink accumulation is all but eliminated. Substantially increased control of the pen-wiping process results in substantially improved performance in low-cost ink-jet printers.

While the present invention has been shown and described with reference to the foregoing operational principles and preferred embodiment, it will be apparent to those skilled in the art that other changes in form and detail may be made therein without departing from the spirit and scope of the invention as defined in the appended claims.

We claim:

1. An ink-jet printer pen wiping method wherein a pen is mounted on a horizontally movable carriage such that its working surface is at a given level and wherein a wiper having a tip is mounted on a vertically movable sled forming part of a service station of the printer, with movement of the carriage and sled being provided by one or more motors responsive to a controller of the printer, the method comprising the step of:

positioning the sled at a first predefined elevation relative to the carriage such that the wiper is below the level of the pen;

first moving the carriage in a first direction to a position above the service station while concurrently moving the sled to a second predefined elevation relative to the carriage, thereby producing controlled-direction flexure of the wiper as the tip of the wiper comes into interference contact with the pen;

wiping the pen with the wiper by a second movement of the carriage in the first direction in such position above the service station relative to the sled with the wiper remaining in interference contact with the pen; and ceasing said second moving of the carriage before the wiper reaches a far end of the pen.

wherein said first moving of the carriage is performed at a first predefined speed as the wiper tip comes into said pen contact and wherein said second moving of the carriage is performed at a second predefined speed as the wiper wipes the pen, such second predefined speed being substantially greater than such first predefined speed.

2. The method of claim 1 which further comprises lowering the sled proximate in time to said ceasing to a second predefined elevation relative to the carriage in which the wiper is clear of the pen.

3. The method of claim 2 which further comprises third moving the carriage in reverse of such first direction, wherein said third moving is performed after said lowering.

4. An apparatus for use in an ink-jet printer having a printhead mounted on said carriage, a chassis and a pen-wiping station positioned generally along a reciprocal motion axis of said printhead carriage for selective wiping of one or more pens of said printhead mounted on the carriage, the appartus comprising:

a sled forming a part of the pen-wiping station, said sled mounting one or more wipers, said sled being mounted relative to the chassis of the printer for vertical movement relative thereto into a pen-wiping elevation relative to the printhead when the carriage is moved into a service position;

a motor operatively connected with the carriage and with said sled for moving said sled into operative pen-wiping engagement with the printhead responsive to a first control signal; and a controller coupled with said motor, said controller producing said first control signal, thereby providing for synchronous generally horizontal movement of the carriage and generally vertical movement of said sled by way of said first control signal, thereby to wipe the pen mounted on the carriage, said control signal causing said motor to move the carriage at a first predefined speed until said sled is moved into operative pen-wiping engagement and for a predetermined wiping period of time thereafter to move the carriage at a second predefined speed that is substantially greater than such first predefined speed and after such predetermined period of time to move the carriage at a third predefined speed that is substantially less than such second predefined speed and thereafter causing the motor to lower said sled out of operative pen-wiping engagement, wherein said controller provides for horizontal movement of the carriage by way of a second control signal to a motor operatively coupled with the carriage, and wherein said synchronous movements include simultaneously horizontal movement of said carriage in proximity to said sled and upward vertical movement of said sled when a pen-wiping commences as said sled-mounted wiper first engages the pen.

5. The apparatus of claim 4, wherein said controller further provides for the carriage's horizontal movement to stop before said wiper reaches an edge of the pen.

6. The apparatus of claim 5, wherein said controller further provides for the sled's downward vertical movement to disengage said wiper from the pen closely proximate in time with such stop of the carriage's movement.

7. The apparatus of claim 6, wherein said controller further provides for the carriage's reverse horizontal movement after said wiper is disengaged from the pen.

8. The apparatus of claim 7, wherein said controller further provides for reverse direction pen wiping with said synchronous movement of the carriage and said sled by said controller.

9. The apparatus of claim 4, wherein said controller provides for same-direction, plural-speed horizontal movement of the carriage, with lower speed movement during first engagement of said wiper with the pen and with higher speed movement thereafter.

10. The apparatus of claim 9, wherein said higher speed movement is substantially higher than said lower speed movement.

* * * * *